Oct. 26, 1948.
G. F. FELTON
2,452,116
HOLDING DEVICE
Filed Sept. 7, 1945
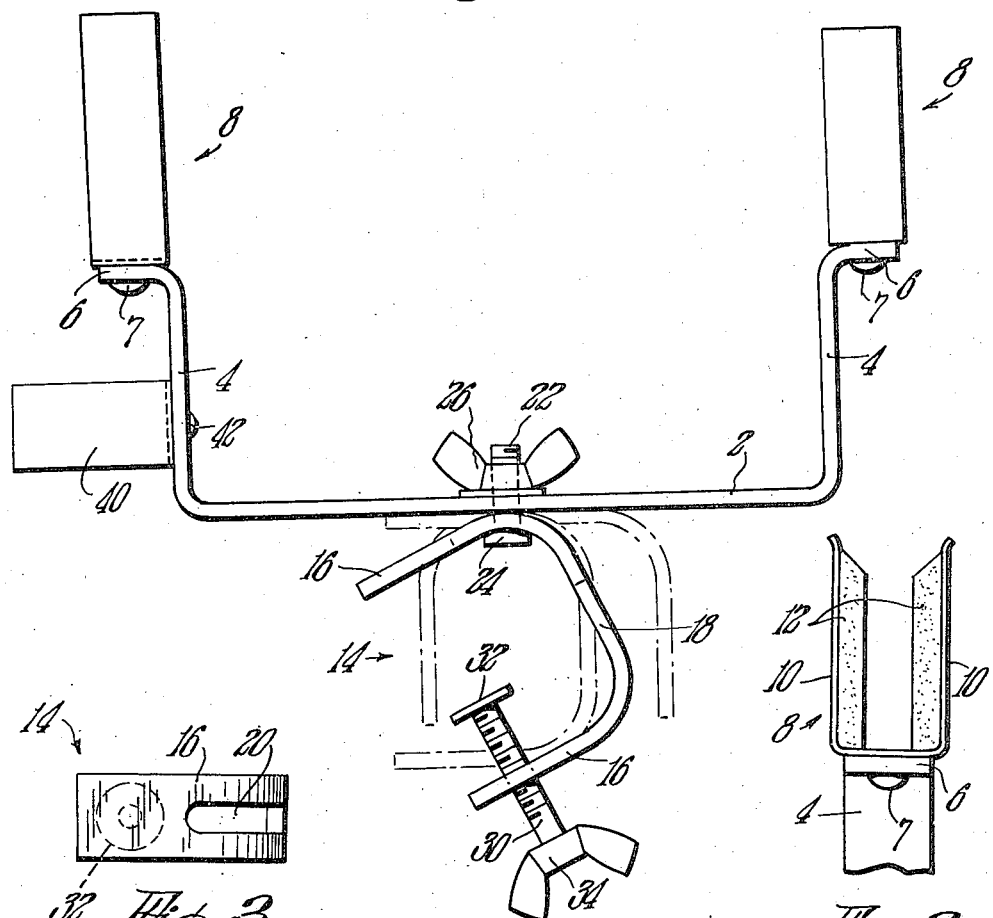
INVENTOR.
George F. Felton.
BY Walter C. Ross.
Attorney.

Patented Oct. 26, 1948

2,452,116

UNITED STATES PATENT OFFICE 2,452,116

HOLDING DEVICE

George F. Felton, Millers Falls, Mass.

Application September 7, 1945, Serial No. 614,968

1 Claim. (Cl. 248—42)

This invention relates to improvements in devices for holding a fishing rod or the like.

The principal objects of the invention are directed to the provision of a device for attachment to a boat or the like which is so constructed and arranged that the holder may be tilted at various angles relative to the part which secures the holder to a support so that the fishing rod held by the device may assume any desired angle.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a side elevational view of a fishing rod holder embodying the novel features of the invention;

Fig. 2 is a partial end elevational view of the holder shown in Fig. 1; and

Fig. 3 is a plan view of the bracket for holding the holder in place.

Referring now to the drawings more in detail, the invention will be fully described.

The device of the invention includes a U-shaped member having a main body portion 2 and side arms 4 extending thereof. The upper ends 6 of the arms 4 extend outwardly therefrom, as shown.

To the parts 6 are secured by rivets 7, U-shaped members such as 8 in Fig. 2 which have spaced side arms 10. Resilient pads 12 secured to the inner faces of the parts 10 which may be made from soft rubber, felt or the like. The members 8 may be similar in form and adapted to receive and releasably grip a fishing rod near its butt end.

A U-shaped member 40, similar to the member 8 and having resilient pads, is secured to member 4 by a rivet 42.

A clamp bracket 14 is provided which has side arms 16 connected to a main part 18 through the curved portions shown. A longitudinal slot 20 is provided which extends through adjacent portions of one side arm and the portion 18.

A clamp screw 22 extends through the slot 20 of the bracket 14 and an opening provided in the member 2 and it has a head 24 for bearing on the inner side of the bracket 14. A thumb nut 26 in threaded engagement with the bolt 22 is provided which is adapted when tightened to clamp the bracket to the member 2.

The connecting portions between the portions 16 and 18 of the bracket are curved as shown so that the bracket 14 and member 2 may swing relative to one another and assume different angular positions such as indicated by the dot-dash lines in Fig. 1.

The bracket 14 has a clamp screw 30 in threaded engagement therewith which carries a head 32 and a manually engageable part 34 for rotating the said screw.

The bracket 14 may receive a part such as the side of a boat or the like and the screw 30 is employed to clamp the bracket to said support. The holder may then be tilted to any desired position relative to the bracket 14 which, as stated, is secured in place to a support by the screw 22 and nut 26.

The movement of the holder relative to the bracket 14 provides a device which enables the user to clamp the device to any available support and at the same time tilt the fishing rod holder so as to give the fishing rod the desired angle.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A device for releasably clamping a fish rod to a support comprising in combination a holder member bent from a single strip of metal to have a substantially straight intermediate portion and side legs at opposite ends thereof extending upwardly from opposite ends thereof at right angles thereto, the upper extremities of said side legs being turned relatively outwardly away from one another at right angles to said legs, a pair of clip members formed from strips of resilient metal to have intermediate portions and spaced arms extending upwardly therefrom, said intermediate portions secured to said extremities, a bracket member formed from a single strip of metal to have a straight central intermediate strut portion with end arc portions curving outwardly and away from opposite ends thereof and extremities in spaced parallel relation disposed at right angles to said strut, an end portion of said strut and one arc and extremity portion adjacent thereto provided with a continuous slot therethrough and said portions adapted to be disposed in contiguous relation on the intermediate portion of said holder, said intermediate portion of the holder provided with an opening therethrough, both means extending through said opening and slot adapted to secure said holder and bracket together in various relative positions, a clamp member in threaded engagement with the other end portion of the bracket for engaging an object between said end portions of the bracket and securing the bracket thereto.

GEORGE F. FELTON.

REFERENCES CITED

The following references are of record in the file of this patent:

UNITED STATES PATENTS

| Number | Name | Date |
|---|---|---|
| 1,035,739 | Raes | Aug. 13, 1912 |
| 1,992,165 | Bardon | Feb. 26, 1935 |
| 2,099,254 | Ballman | Nov. 16, 1937 |
| 2,130,650 | Peterson | Sept. 20, 1938 |

FOREIGN PATENTS

| Number | Country | Date |
|---|---|---|
| 37,949 | Sweden | Dec. 2, 1914 |